(12) United States Patent
Kim et al.

(10) Patent No.: US 12,561,788 B2
(45) Date of Patent: Feb. 24, 2026

(54) FLUORESCENCE MICROSCOPY METROLOGY SYSTEM AND METHOD OF OPERATING FLUORESCENCE MICROSCOPY METROLOGY SYSTEM

(71) Applicant: Samsung Electronics Co., Ltd., Suwon-si (KR)

(72) Inventors: Namyoon Kim, Suwon-si (KR); Doory Kim, Seoul (KR); Wookrae Kim, Suwon-si (KR); Myungjun Lee, Suwon-si (KR); Jaehwang Jung, Suwon-si (KR); Changhoon Choi, Suwon-si (KR); Dokyung Jeong, Seoul (KR); Uidon Jeong, Seoul (KR)

(73) Assignees: Samsung Electronics Co., Ltd., Gyeonggi-do (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 18/528,206

(22) Filed: Dec. 4, 2023

(65) Prior Publication Data

US 2024/0212122 A1 Jun. 27, 2024

(30) Foreign Application Priority Data

Dec. 27, 2022 (KR) ........................ 10-2022-0186012
Jul. 14, 2023 (KR) ........................ 10-2023-0091682

(51) Int. Cl.
*G06T 7/00* (2017.01)
*G02B 21/00* (2006.01)
(Continued)

(52) U.S. Cl.
CPC .......... *G06T 7/0004* (2013.01); *G02B 21/008* (2013.01); *G06T 5/30* (2013.01);
(Continued)

(58) Field of Classification Search
CPC ........ G02B 21/008; G06T 2207/10056; G06T 2207/10064; G06T 2207/30148; G06T 5/30; G06T 7/0004; G06T 7/13
(Continued)

(56) References Cited

U.S. PATENT DOCUMENTS 8,045,179 B1 10/2011 Zhuang et al.
9,297,768 B2 3/2016 Yager et al.
(Continued)

FOREIGN PATENT DOCUMENTS

KR 10-2008-0075379 A 8/2008
KR 10-2012-0018688 A 3/2012
(Continued)

*Primary Examiner* — Christopher S Kelley
*Assistant Examiner* — Ana Picon-Feliciano
(74) *Attorney, Agent, or Firm* — Harness, Dickey & Pierce, P.L.C.

(57) ABSTRACT

A fluorescence microscopy metrology system includes an optical system configured to generate first light and second light having different wavelengths, a microscope body configured to irradiate a sample, coated with a fluorescent material, with the first light and the second light received from the optical system, and to receive fluorescence reflected from the sample, an image detection device configured to detect a fluorescence image corresponding to the received fluorescence, and a nanostructure analysis device configured to measure line edge roughness (LER) from the detected fluorescence image, to analyze power spectral density (PSD), or to detect a nanoparticle defect.

20 Claims, 19 Drawing Sheets

(51) Int. Cl.
  *G06T 5/30*          (2006.01)
  *G06T 7/13*          (2017.01)

(52) U.S. Cl.
  CPC ...... *G06T 7/13* (2017.01); *G06T 2207/10056*
    (2013.01); *G06T 2207/10064* (2013.01); *G06T*
                    *2207/30148* (2013.01)

(58) Field of Classification Search
  USPC .......................................................... 348/79
  See application file for complete search history.

(56)                    References Cited

U.S. PATENT DOCUMENTS

| | | | |
|---|---|---|---|
| 9,433,967 B2 | 9/2016 | Asano | |
| 2014/0264016 A1 | 9/2014 | Chen et al. | |
| 2015/0017399 A1 | 1/2015 | Badyal et al. | |
| 2016/0298241 A1 | 10/2016 | Yoon et al. | |
| 2017/0307440 A1* | 10/2017 | Urban ................ | G01N 21/6458 |
| 2020/0257100 A1* | 8/2020 | Putman ................ | G02B 21/365 |
| 2021/0142977 A1* | 5/2021 | Mack ......................... | G06T 7/40 |
| 2021/0172877 A1* | 6/2021 | Sase ....................... | G01N 21/64 |
| 2021/0225609 A1 | 7/2021 | Mack | |
| 2022/0034653 A1 | 2/2022 | Shintani et al. | |
| 2022/0107179 A1 | 4/2022 | Hu et al. | |

FOREIGN PATENT DOCUMENTS

| | | |
|---|---|---|
| KR | 10-2016-0056590 A | 5/2016 |
| KR | 101723789 B1 | 4/2017 |
| KR | 10-2022-0052257 A | 4/2022 |

* cited by examiner 800 nm                    950 nm 1050 nm                   1100 nm True LER : 2nm          True LER : 10nm          True LER : 20nm
Measured LER : 19nm     Measured LER : 32nm      Measured LER : 43nm equiv_diameter =

| 1 | 2 | 3 | 4 | 5 | 6 | 7 |
|---|---|---|---|---|---|---|
| 142.8188 | 163.5329 | 125.9544 | 178.1264 | 118.5387 | 195.1277 | 139.6090 (nm) |

FLUORESCENCE MICROSCOPY METROLOGY SYSTEM AND METHOD OF OPERATING FLUORESCENCE MICROSCOPY METROLOGY SYSTEM

CROSS-REFERENCE TO RELATED APPLICATION(S)

This application claims benefit of priority to Korean Patent Applications Nos. 10-2022-0186012 filed on Dec. 27, 2022 and 10-2023-0091682 filed on Jul. 14, 2023 in the Korean Intellectual Property Office, the disclosures of each of which are incorporated herein by reference in their entireties.

BACKGROUND

The present inventive concepts relate to a fluorescence microscopy metrology system and a method of operating the same.

In general, a semiconductor structure metrology device that uses fluorescence microscopy involves a process of coating the semiconductor with a fluorescent material. This fluorescent material emits light when exposed to light of a specific wavelength. After the semiconductor sample has been coated with the fluorescent material, the semiconductor structure metrology device excites this material by irradiating the sample with light of that specific wavelength. In this step, the fluorescence microscopy detects light emitted by the fluorescent material. The exact position of the emitted light is then analyzed to determine the structure and characteristics of the semiconductor sample. This method is non-destructive and allows for structure measurements with a precision of several tens of nanometers, making it valuable in the semiconductor industry. Recently, various super-resolution optical microscopes that exceed the theoretical resolution of traditional optical microscopy—also known as the diffraction limit of light—have been developed. Among them, Stochastic Optical Reconstruction Microscopy (STORM) technology uses a photo-switching phenomenon in the presence of a thiol-based imaging buffer solution. This separates overlapping fluorescent molecules by the time-period and facilitates super-resolution imaging.

SUMMARY

An aspect of the present inventive concepts provides a fluorescence microscopy metrology system for obtaining a line edge roughness (LER) from a super-resolution fluorescence image, analyzing a power spectral density (PSD), and automatically detecting a nanoparticle defect, and a method of operating the same.

According to an aspect of the present inventive concepts, there is provided a fluorescence microscopy metrology system including an optical system configured to generate first light and second light having different wavelengths, the first light and the second light configured to excite a fluorescent material; a microscope body configured to irradiate a sample, coated with the fluorescent material, with the first light and the second light received from the optical system such that the fluorescent material fluoresces, and to receive the fluorescence from the sample; an image detection device configured to detect a fluorescence image corresponding to the received fluorescence; and a nanostructure analysis device including processing circuitry configured to, from the detected fluorescence image, at least one of measure line edge roughness (LER) of the sample, analyze power spectral density (PSD) of the sample, or detect a nanoparticle defect of the sample.

According to another aspect of the present inventive concepts, there is provided a method of operating a fluorescence microscopy metrology system, the method including irradiating a sample with a first light and a second light; receiving fluorescence generated by the sample; detecting a fluorescence image corresponding to the received fluorescence; and analyzing a nanostructure from the fluorescence image, wherein the analyzing the nanostructure includes at least one of determining line edge roughness (LER) from the detected fluorescence image, analyzing power spectral density (PSD) from the detected fluorescence image, or detecting a nanoparticle defect from the detected fluorescence image.

According to another aspect of the present inventive concepts, there is provided a computing device including at least one processor, and a memory device at least one processor; and a memory device storing instructions, which when executed in the at least one processor, cause the computing device to at least one of determine LER from a fluorescence image, analyze PSD from the fluorescence image, or detect a nanoparticle defect from the fluorescence image.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
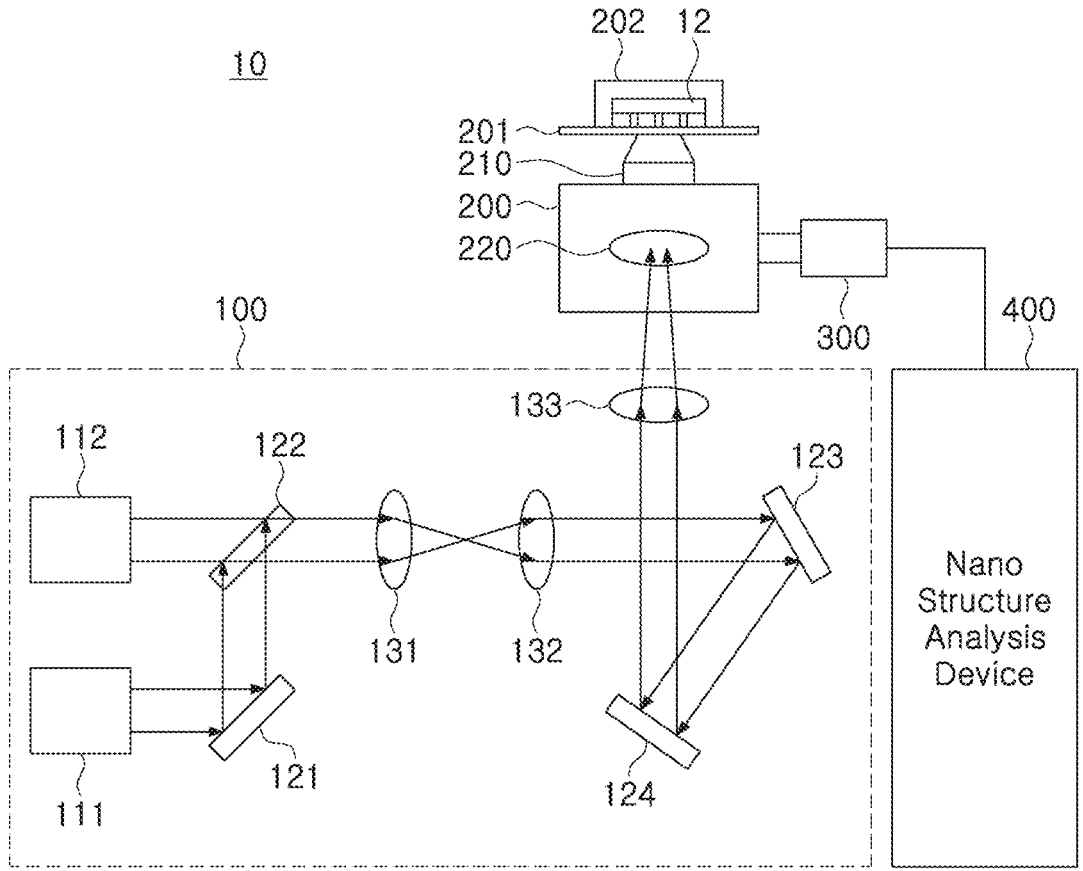
FIG. 1 is an example diagram illustrating a fluorescence microscopy metrology system according to at least one example embodiment of the present inventive concepts.

Hereinafter, example embodiments of the present inventive concepts will be described clearly and specifically such that a person skilled in the art easily could carry out example embodiments using the drawings. In the drawings, the functional blocks, including those including "device," "processor," and/or "module," etc., unless expressly indicated otherwise, may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a System-on-Chip (SoC), a programmable logic unit, a microprocessor, application-specific integrated circuit (ASIC), an integrated circuit, an application specific IC (ASIC), a field programmable gate array (FPGA), and a complex programmable logic device (CPLD), firmware driven in hardware devices, etc.

Additionally, when the terms "about" or "substantially" are used in this specification in connection with a numerical value and/or geometric terms, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

According to some embodiments of the present invention, a fluorescence microscopy measurement system and an operating method thereof may obtain information regarding Line Edge Roughness (LER) and Power Spectral Density (PSD) from super-resolution fluorescence microscopy images of a semiconductor. The fluorescence microscopy measurement system is configured to measure LER using images acquired through super-resolution fluorescence microscopy. Further, the fluorescence microscopy measurement system may analyze PSD based on images obtained via super-resolution fluorescence microscopy. Moreover, the fluorescence microscopy measurement system may automatically detect nanoparticle defects on the substrate using images obtained from high-resolution fluorescence microscopy.

FIG. 1 is an example diagram illustrating a fluorescence microscopy metrology system 10 according to at least one example embodiment of the present inventive concepts. Referring to FIG. 1, a fluorescence microscopy metrology system 10 may include an optical system 100, a microscope body 200, an image detection device 300, and a nanostructure analysis device 400.

The optical system 100 may be implemented to output two (or more) different light sources to the microscope body 200. For example, the optical system 100 may include a first light source 111, a second light source 112, first to fourth mirrors 121 to 124, and first to third lenses 131 to 133.

The first light source 111 may be implemented to output a first light having a first wavelength. In at least one example embodiment, the first light may be laser light having a peak wavelength of 405 nm. The second light source 112 may be implemented to output a second light having a second wavelength. In at least one example embodiment, the second light may be laser light having a greater peak wavelength than the first wavelength. For example, the second wavelength may be 647 nm.

The first light provided from the first light source 111 133 may sequentially pass through the first mirror 121, the second mirror 122, the first lens 131, the second lens 132, the third mirror 123, the fourth mirror 124, and the third lens 133, and may be provided to the microscope body 200. The second light provided from the second light source 112 may sequentially pass through the second mirror 122, the first lens 131, the second lens 132, the third mirror 123, the fourth mirror 124, and the third lens 133, and may be provided to the microscope body 200. It should be understood that movement paths of the first light and the second light illustrated in FIG. 1 are only examples and may be implemented in various manners.

A fluorescence microscopy may be implemented to detect a semiconductor pattern coated with a fluorescent material. Here, Alexa Fluor 647 may be used as the fluorescent material. However, it should be understood that the fluorescent material is not limited thereto. In addition, the fluorescence microscopy may be a super-resolution microscopy. The super-resolution microscopy may have a spatial resolution ranging from 10 nm to 20 nm. For example, the fluorescence microscopy may be one of stochastic optical reconstruction microscopy (STORM), stimulated emission depletion (STED), saturated structured illumination microscopy (SSIM), photoactivated localization microscopy (PALM), and/or the like. Hereinafter, for convenience of description, the fluorescence microscopy will be referred to as STORM.

The microscope body 200 may include a stage 201, a cover glass 202, an objective lens 210, and a backport 220.

The stage 201 may be disposed on the microscope body 200. The stage 201 may be configured to transmit light and to have a sample 12 disposed on an upper surface of the stage 201. Here, the sample 12 may include a substrate and a semiconductor pattern formed on the substrate. For example, the semiconductor pattern of the sample 12 may be disposed to oppose the upper surface of the stage 201. It should be understood that the arrangement of the sample 12 according to the present inventive concepts is not limited thereto. The substrate of the sample 12 may be disposed to oppose the upper surface of the stage 201. The cover glass 202 may be configured to be disposed on the upper surface of the stage 201. For example, the cover glass 202 may be disposed to cover the sample 12. The objective lens 210 may be disposed between the microscope body 200 and the stage 201. The objective lens 210 may be implemented to condense light passing through the body of the microscope body 200 onto the sample 12.

The first light and the second light provided to the microscope body 200 may sequentially pass through the objective lens 210 and the stage 201, and may be provided to the sample 12. The first light and the second light provided to the sample 12 may excite a phosphor formed (e.g., deposited) on a surface of the semiconductor pattern of the sample 12. For example, the first light may first excite the phosphor. Then, after a predetermined (and/or otherwise determined) period of time expires, the second light may secondarily excite the phosphor. The phosphor may be repeatedly excited through the first light and the second light. Fluorescence generated by the phosphor excited by the first light and the second light may be provided to the backport 210 of the microscope body 200. Here, the backport 210 may be an output port for connection to the image detection device 300.

The image detection device 300 may be implemented to detect light output from the backport 210 and generate a fluorescence image. In at least one example embodiment, the image detection device 300 may include an electron multiplying charge coupled device (EM-CCD). It should be understood that the image detection device 300 is not limited thereto. The image detection device 300 may be implemented as a complementary metal oxide semiconductor (CMOS) image sensor. In at least one example embodiment, the image detection device 300 may be attached to the body of the microscope body 200.

The nanostructure analysis device 400 may be implemented to receive a super-resolution fluorescence microscopy image, obtain LER from the fluorescence image, analyze PSD, and inspect a structural defect using different point spread functions (PSFs). Here, the PSF may be a function describing how light from a point source spreads while passing through a system. In addition, super resolution may refer to a resolution of 50 nm or less.

In general, a metrology system using SEM (Scanning Electron Microscopy) injects an electron beam into a vacuum chamber and obtains structural information from electrons reflected off a semiconductor wafer to inspect defects. For observing cross-sectional structures, the metrology system may require ion milling and can achieve nanometer-level resolution. However, such electron based microscopy necessitates super vacuum conditions and could take an extended period when inspecting large-area samples using scanning techniques. A notable characteristic of the metrology system employing SEM includes challenges in measuring bottom/internal defects that arise during microprocessing, the need for a vacuum chamber, and the extended time required for detection.

However, the fluorescence microscopy metrology system 10 may calculate LER from a fluorescence microscopy image, analyze PSD, and enable inspection by depth direction based on a PSF, thereby automatically obtaining information on a semiconductor nanopattern structure and a defect. In particular, the fluorescence microscopy metrology system 10 may use a super-resolution fluorescence microscopy, thereby enabling high-sensitivity/high-resolution optical inspection with a resolution of 20 nm or less.

LER Measurement

Figure 2:
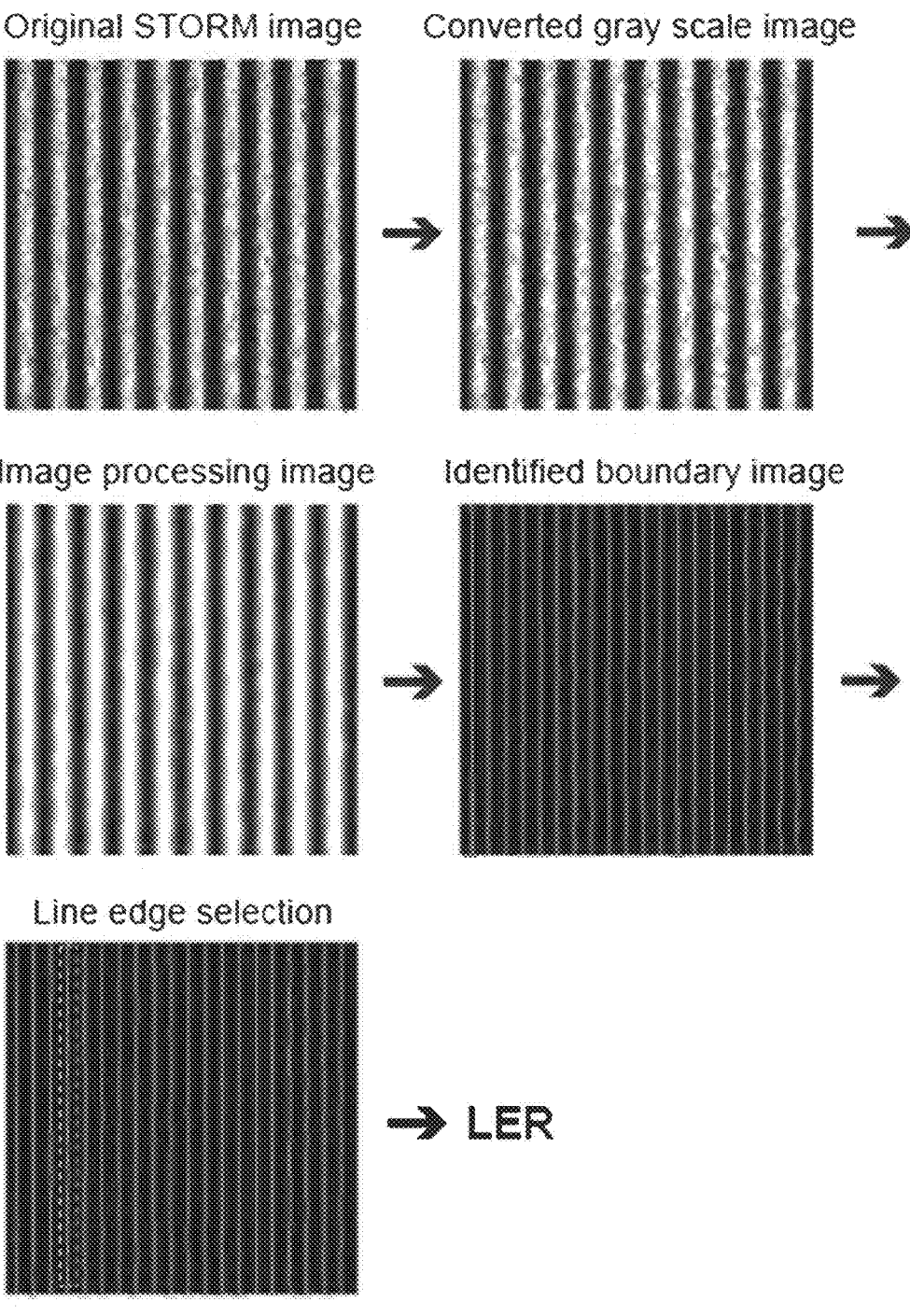
FIG. 2 is an example diagram illustrating a process of obtaining LER from a fluorescence microscopy image according to at least one example embodiment of the present inventive concepts.

FIG. 2 is an example diagram illustrating a process of obtaining LER from a fluorescence microscopy image according to at least one example embodiment of the present inventive concepts.

As illustrated in FIG. 2, a semiconductor image obtained through super-resolution fluorescence microscopy may be converted into a gray-scale image, and an image processing process of creating erosion and dilation may be performed to detect only an outer portion of a line while filling an empty space of a stippled portion inside the line. In these cases, a line edge detection algorithm (for example, a Canny algorithm) may be used to detect a line edge. Thereafter, a central portion of the line edge may be calculated by selecting a specific portion of the detected line edge, and a standard deviation value therefore may be calculated. Three times the standard deviation calculated in such a manner may be calculated as LER. For example, a process of obtaining LER from a super-resolution fluorescence microscopy image may include, a first process of converting a super-resolution fluorescence microscopy color image into a gray-scale image, a second process of filling an empty space of a stippled portion within a line structure width through erosion and dilation operations to detect only a semiconductor line edge from the super-resolution image, a third process of detecting only a line edge using a line edge detection algorithm (for example, the Canny algorithm), a fourth process of selecting only a specific portion of an image of the detected line edge, and a final process of measuring LER of the selected specific line edge.

In general, the Canny algorithm may be performed through the following operations: Noise Removal, wherein noise may be removed from an image using a Gaussian filter (such an operation may be important to minimize a false edge that may be generated by noise in a subsequent edge detection process); Edge Strength Calculation, wherein an edge strength and a direction of each pixel may be calculated using a gradient operator such as a Sobel filter; Non-Maximum Suppression wherein in each pixel, only a pixel, having a maximum edge strength in gradient direction, may remain (e.g., through such an operation, a "true" edge may remain, and less important edges may be removed); Double Threshold Processing, wherein two thresholds (a high threshold and a low threshold) may be set to distinguish between strong and weak edges and a non-edge pixel (for example, the strong edge may be classified as a true edge, and the weak edge may be classified as an edge or a non-edge based on a threshold); and/or Edge Tracking by Hysteresis, wherein a weak edge adjacent to a strong edge may be maintained as an edge, and a weak edge not adjacent to the strong edge may be removed. Such an operation may assist in removing a false edge from a final result.

Figure 3A:
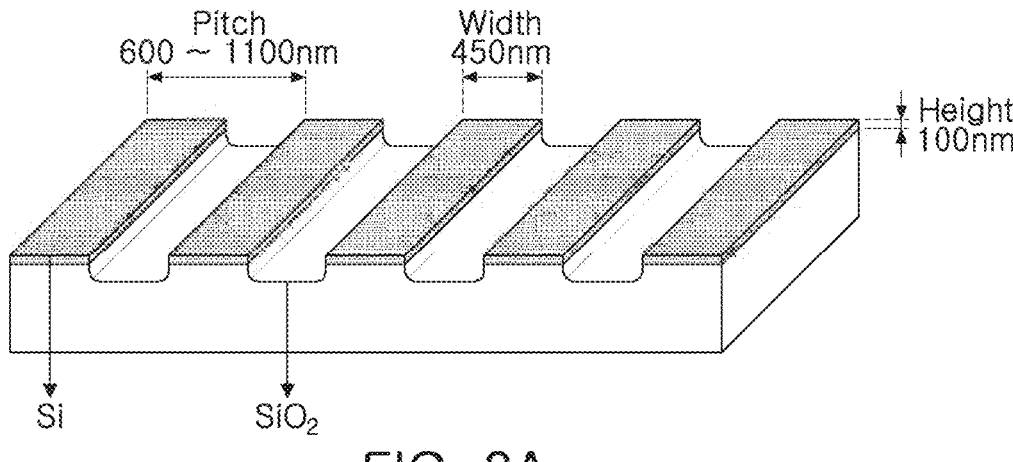
FIGS. 3A, 3B, and 3C are example diagrams illustrating a semiconductor sample and images of a $SiO_2$ line pattern and a Si line pattern obtained through super-resolution fluorescence microscopy according to at least one example embodiment of the present inventive concepts.
Figure 3B:
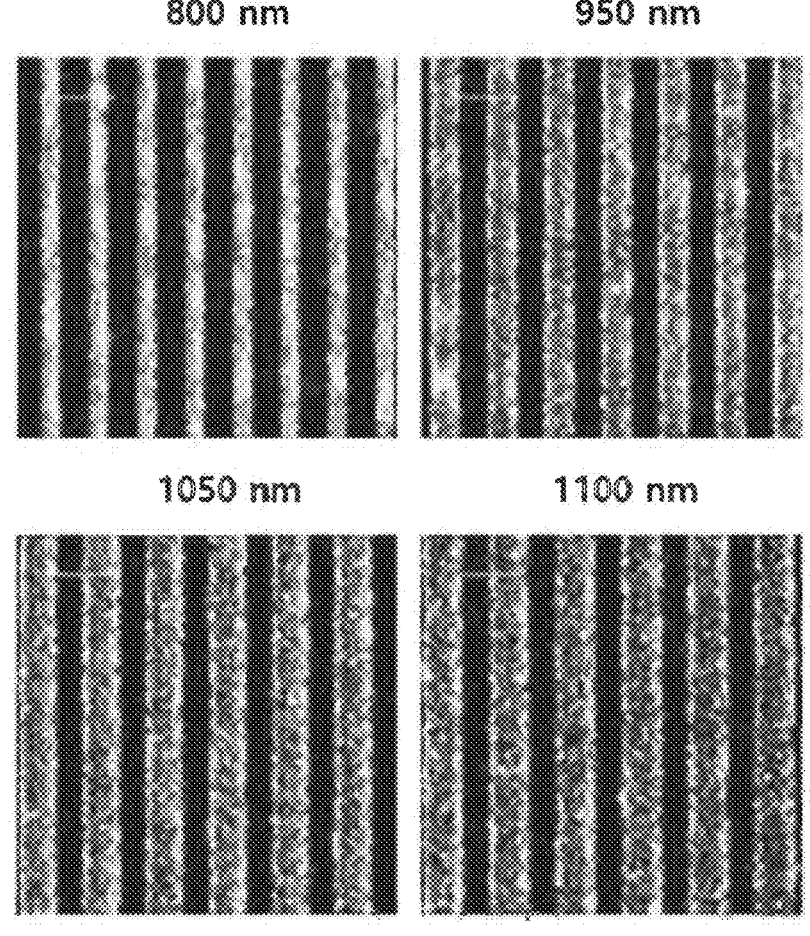
Figure 3C:
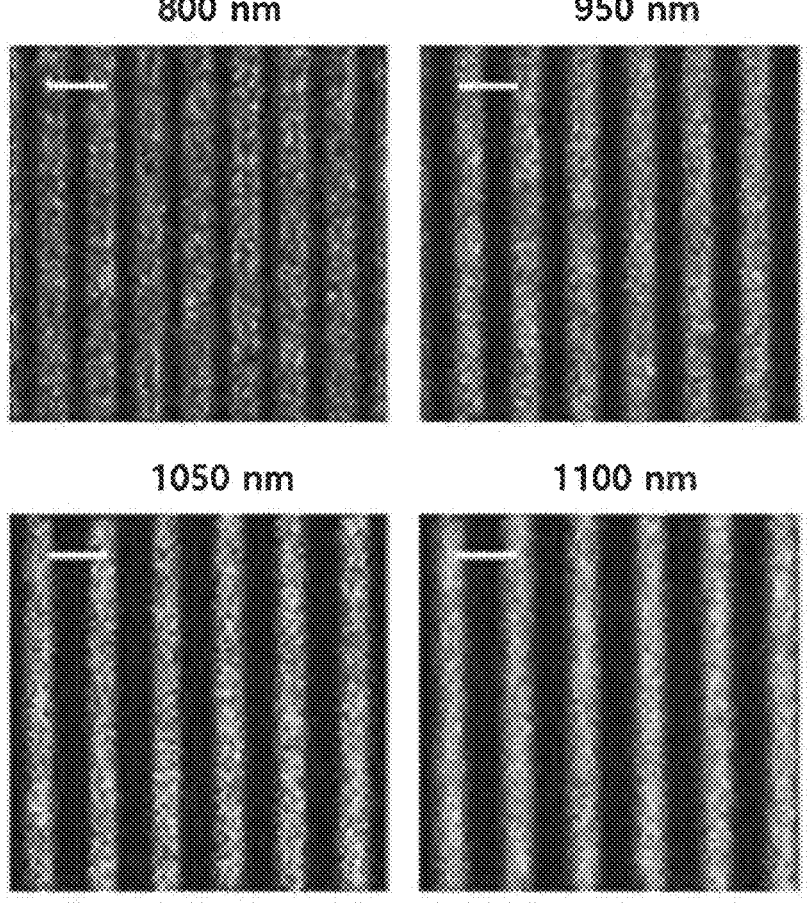

FIGS. 3A, 3B, and 3C are example diagrams illustrating a semiconductor sample according to at least one example embodiment of the present inventive concepts. Referring to FIG. 3A, the sample (e.g., 12 of FIG. 1) may have a Si pattern and a $SiO_2$ pattern alternately disposed within a substrate thereof. Referring to FIG. 3B, fluorescence images of the sample having $SiO_2$ patterns having various sizes are illustrated. Referring to FIG. 3C, fluorescence images of the sample having Si patterns having various sizes are illustrated.

In at least one example embodiment, a semiconductor pattern of the sample may include only a one layer (e.g., a first layer), two layers (e.g., a first layer and a second layer), or more layers. For example, the semiconductor pattern may include a first layer disposed on the substrate and a second layer disposed on the first layer. In at least one example embodiment, the first layer and the second layer may include different materials. For example, the first layer may be a silicon oxide layer including $SiO_2$, and the second layer may be a silicon layer including Si. In another example embodiment, the first layer may be a silicon oxide layer including $SiO_2$, and the second layer may include a material other than $SiO_2$. In another example embodiment, the second layer may be a silicon layer including Si, and the first layer may include a material other than Si. Here, a semiconductor sample drawing structure consecutively having a $SiO_2$ line pattern and a Si line pattern used for performance verification and an original image of each of a $SiO_2$ line pattern and a Si line pattern obtained through super-resolution fluorescence microscopy are illustrated. A pitch of a semiconductor sample may be 600 nm to 1100 nm, a width of Si may be 450 nm, and a height of Si in $SiO_2$ may be 100 nm. A numeral above an image may refer to a pitch value of a line pattern.

Using a technology for measuring LER of a super-resolution fluorescence microscopy semiconductor image, developed in such a manner, LER of a line pattern may be measured from super-resolution fluorescence images of $SiO_2$/Si nanopatterns having various sizes within a substrate.

Figure 4A:
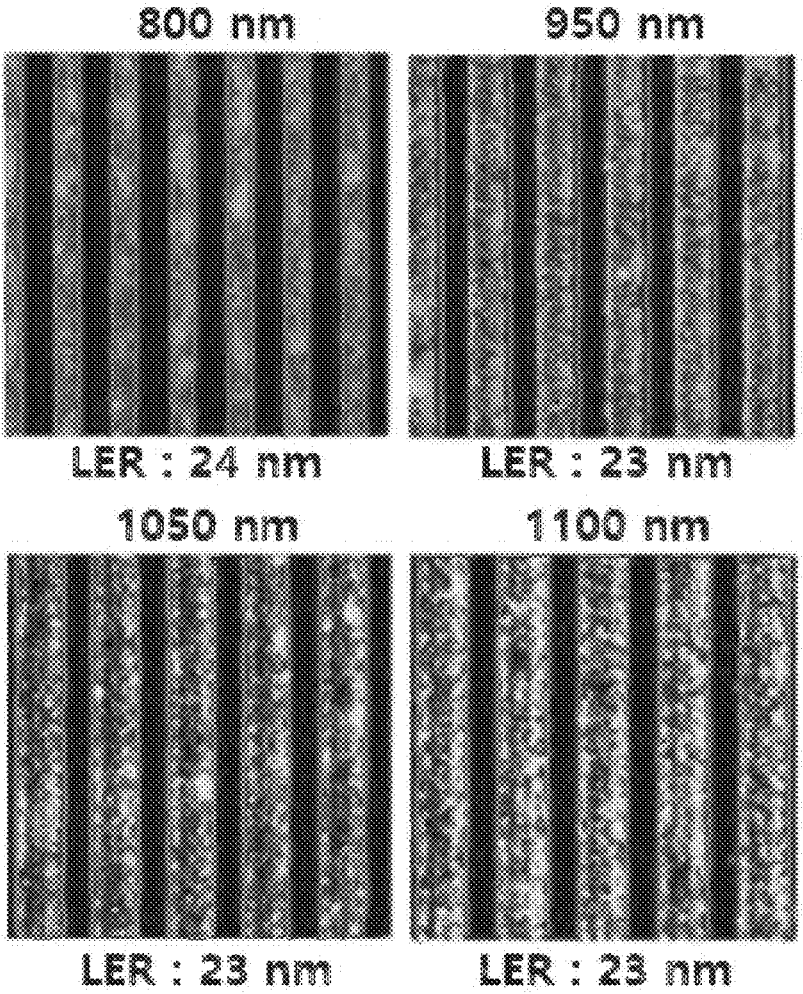
FIGS. 4A and 4B are example diagrams illustrating results of measuring LER of images of a $SiO_2$ line pattern and a Si line pattern obtained through super-resolution fluorescence microscopy.
Figure 4B:
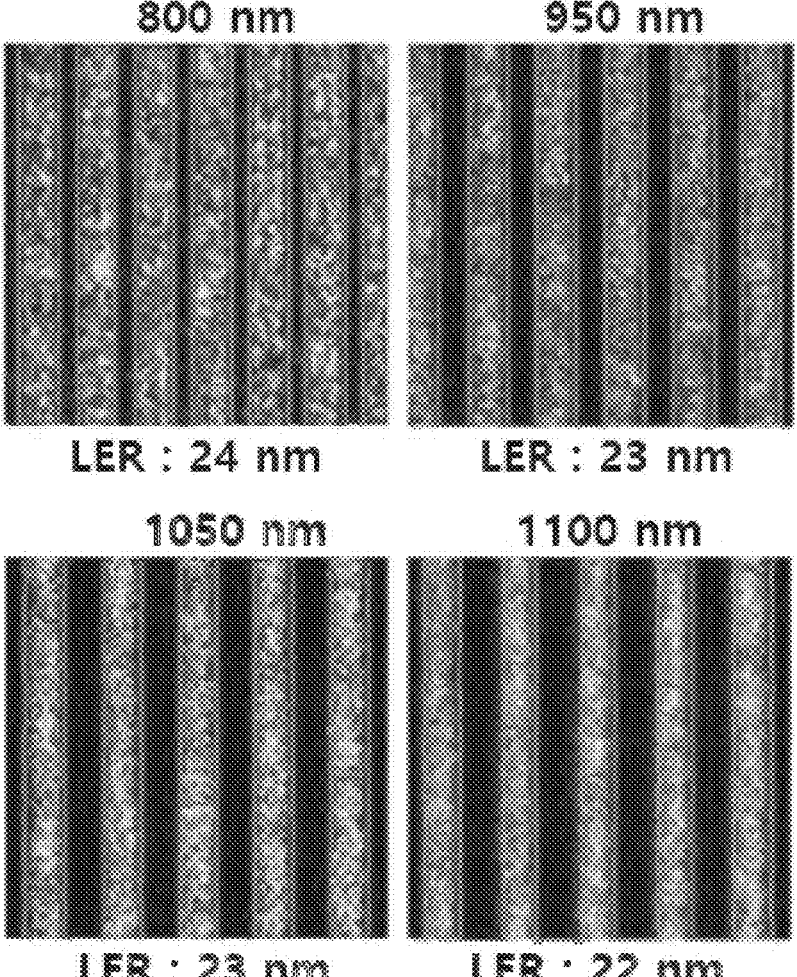

FIGS. 4A and 4B are example diagrams illustrating results of measuring LER of images of a $SiO_2$ line pattern and a Si line pattern obtained through super-resolution fluorescence microscopy. A numeral above a fluorescence image may refer to a pitch value of a line pattern, and a numeral below the fluorescence image may refer to a result value of LER measured from the super-resolution fluorescence image.

Figure 5:
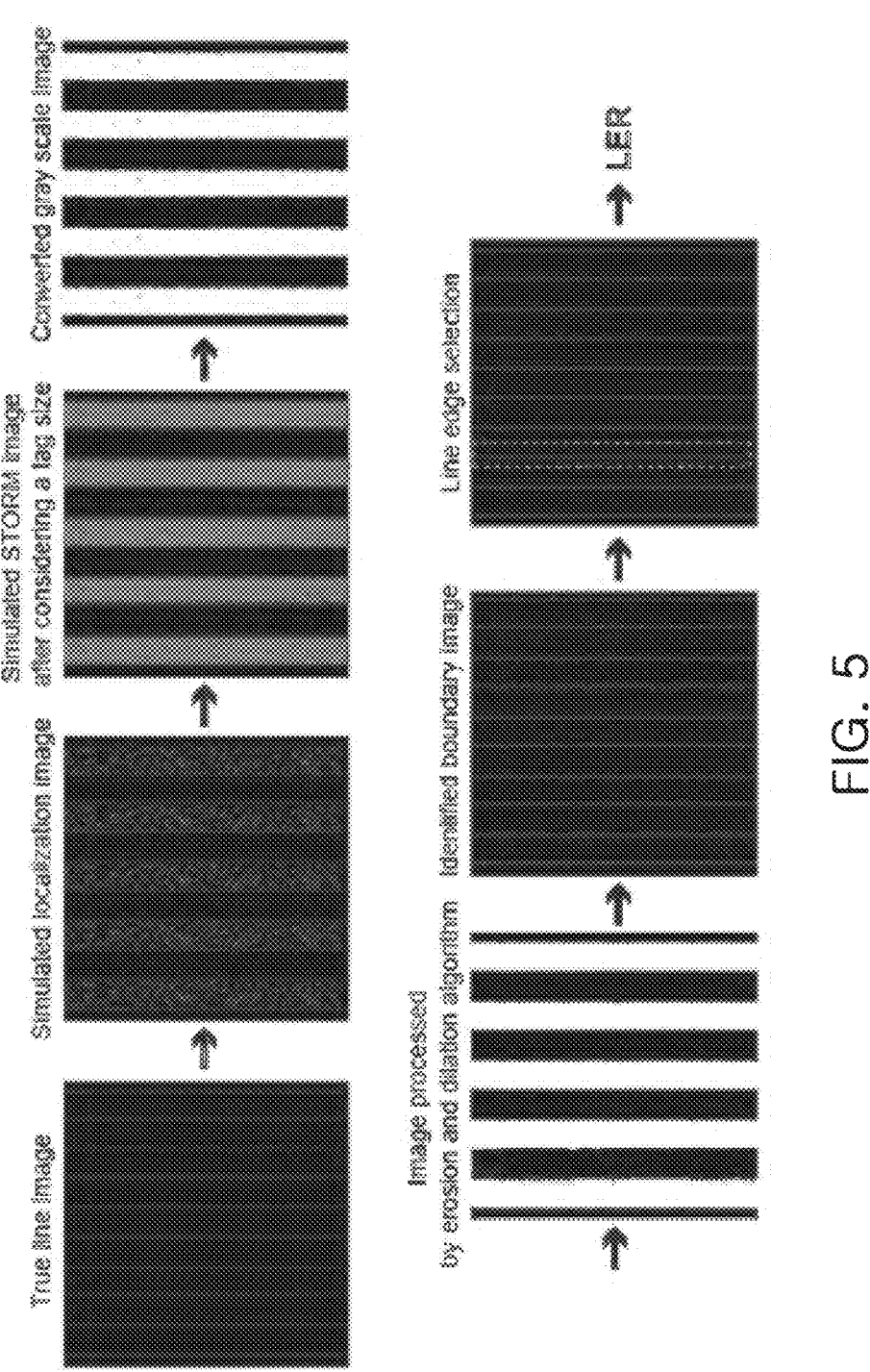
FIG. 5 is an example diagram illustrating a process of measuring LER through simulation according to at least one example embodiment of the present inventive concepts.

FIG. 5 is an example diagram illustrating a process of measuring an LER through simulation according to at least one example embodiment of the present inventive concepts. Referring to FIG. 5, a process of calculating an LER is as follows.

In order to verify a result value of LER measured from a super-resolution fluorescence microscopy (STORM) semiconductor image, simulation may be performed on the super-resolution fluorescence microscopy semiconductor image. The super-resolution fluorescence microscopy semiconductor image may consist of a collection of dots using stippling, and uncertainty of localization corresponding to a position of each dot may result in additional roughness caused by the super-resolution fluorescence microscopy image, not inherent roughness of a semiconductor sample. In order to calculate a degree of roughness that may additionally occur in such a stippling-based super-resolution image, it may be necessary to simulate a super-resolution image obtained with respect to a structure having known line edge roughness. To this end, the super-resolution semiconductor image may be simulated with respect to each of line structures having different line edge roughness, such that a theoretical super-resolution image based on each structure may be generated. Simulation parameters may be set to be equal to a value measured from the super-resolution fluorescence microscopy semiconductor image.

A simulation may be conducted taking into account the resolution (25 nm) determined by the localization uncertainty of each dot, the dot density (0.0039 $nm^2$ or 0.0039 $nm^{-2}$) representing the distribution degree of dots in a super-resolution fluorescence microscopy image, the size of a dot observed in such microscopy, and the number of fluorescence switches (e.g., 16), which corresponds to the number of dots originating from a single molecule. These simulation parameters might vary based on the imaging conditions. To analyze the generated super-resolution fluorescence microscopy semiconductor simulation image, data should be processed in the same manner as the processing of the experimental image data described previously. LER measurement can then be performed. For example, to detect only the edge of a semiconductor line from a super-resolution simulation image created using stippling, voids in the stippled portions may be filled via erosion and dilation operations. Next, only the line edge might be detected using the Canny algorithm. Subsequently, only a specific portion could be selected from the image of the detected line edge. Finally, the LER of the selected specific line edge can be calculated.

Referring back to FIG. 5, first, a semiconductor line structure having a desired LER value may be generated. Second, a simulation image may be generated in consideration of localization uncertainty that may occur in an actual super-resolution fluorescence microscopy. Third, in consideration of each tag size, a simulation image having a larger localization size may be generated. Fourth, the simulation image may be converted into a gray-scale image to be represented as a one-dimensional image. Fifth, to facilitate line edge detection, erosion and dilation operations may be used to fill an empty space of a stippled portion. Sixth, only a line edge may be detected using a line edge detection algorithm (for example, a Canny algorithm). Seventh, only a specific portion may be selected from an image of the detected line edge. Finally, the LER of the selected line edge may be measured.

Figure 6:
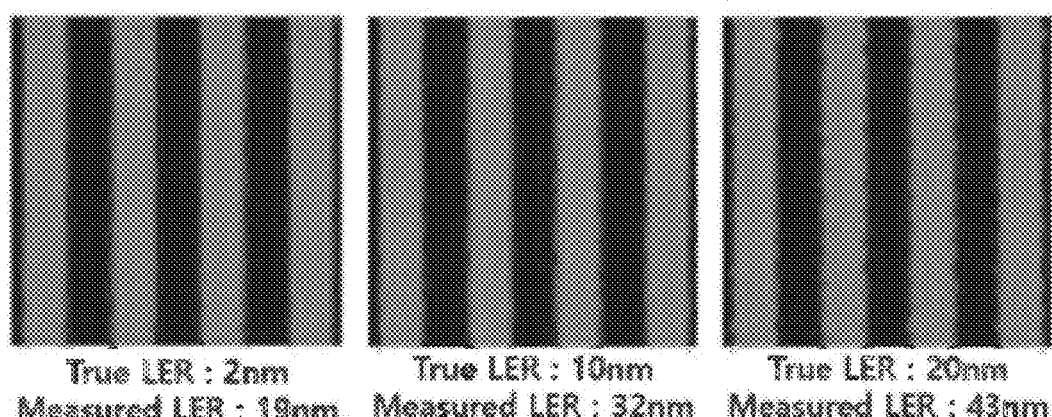
FIG. 6 is an example diagram illustrating an LER value based on a simulation result according to at least one example embodiment of the present inventive concepts.

FIG. 6 is an example diagram illustrating an LER value based on a simulation result according to at least one example embodiment of the present inventive concepts. As illustrated in FIG. 6, a measured roughness value may be obtained as a result of the simulation with respect to a theoretical roughness value of an actual structure. When roughness of the actual structure is increased, roughness of a simulated STORM image may also increase. In addition, in a super-resolution fluorescence microscopy, an image may be expressed using stippling considering localization uncertainty, and thus it may be confirmed that the measured roughness value is higher than the actual roughness value.

Figure 7:
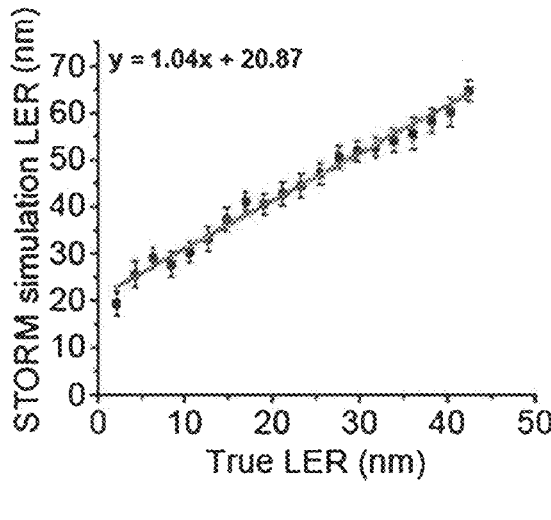
FIG. 7 is a diagram illustrating an LER value (STORM simulation LER) obtained as an analysis value when a super-resolution fluorescence microscopy image is obtained with respect to a line structure having a specific actual LER value (true LER)

FIG. 7 is a diagram illustrating a comparison between measured LER and specific actual LER of a super-resolution fluorescence microscopy semiconductor image. As illustrated in FIG. 7, a correlation between an actual roughness and a measured roughness may be analyzed to determine how higher the measured roughness is than the actual roughness. A roughness measured by a super-resolution fluorescence microscopy may be consistently greater than a roughness of an actual semiconductor nanopattern by about 20 nm. The actual roughness may be predicted using consistent roughness added by stippling of STORM, when a roughness is measured from a semiconductor image obtained with the super-resolution fluorescence microscopy. For example, when a roughness measured from an experimental STORM image is 40 nm, the roughness of a line structure of an actual sample may be about 20 nm.

FIG. 7, a graph illustrating a correlation between measured LER when and specific actual LER of a simulated super-resolution fluorescence microscopy semiconductor image, illustrates a correction of measured LER=1.04× (actual LER of a line structure)+20.87. A roughness of an actual semiconductor structure may be predicted using the graph as a calibration curve, when a roughness is measured from a semiconductor image obtained through super-resolution fluorescence microscopy.

PSD Analysis

As described above, LER, which is defined as three times the standard deviation value of a distance from a central portion of a line edge, may indicate roughness characteristics of a semiconductor line structure, and thus may be widely used. However, there is a limitation in that the value of LER varies greatly depending on noise. For example, in an SEM image, an image noise value may vary greatly depending on scanning speed. Such noise may greatly affect LER calculation, making it difficult to measure an LER value of an actual line structure. In order to overcome such a limitation, PSD analysis may be used.

In the PSD analysis, fast Fourier transform (FFT) analysis may be performed on displacement of a line edge to draw a PSD graph. A PSD value drawn in such a manner may be divided into a noise value and a PSD value from an actual structure. Fitting may be possible with respect to the PSD value from the actual structure. Accordingly, a correlation length value may be obtained, as indicated in the following equation.

$$PSD(f) = L \times |FFT(d(x))|^2 \qquad \text{[Equation 1]}$$

$$L = N\Delta x$$

$$PSD_{biased}(f) = PSD_{unbiased}(f) + \sigma^2_{noise} \times L$$

$$PSD_{unbiased}(f) = \left(2\sigma^2\xi \frac{\sqrt{\pi}\,\Gamma\left(H + \frac{1}{2}\right)}{\Gamma(H)}\right) \div \left([1 + (2f\xi)^2]^{H+\frac{1}{2}}\right)$$

$L$:length of the detected edge $f$:spatial frequency $d(x)$:edge displacement $\Delta x$:optimal spacing $N$:grid point $\sigma^2_{noise}$:random error $\sigma$:standard deviation of line $\xi$:correlation length $\Gamma$:gamma function $H$:hurst exponent The correlation length value may be determined from a transition decay value from a low spatial frequency to a high spatial frequency of LER, and may indicate a roughness frequency degree of a sample structure.

Figure 8:
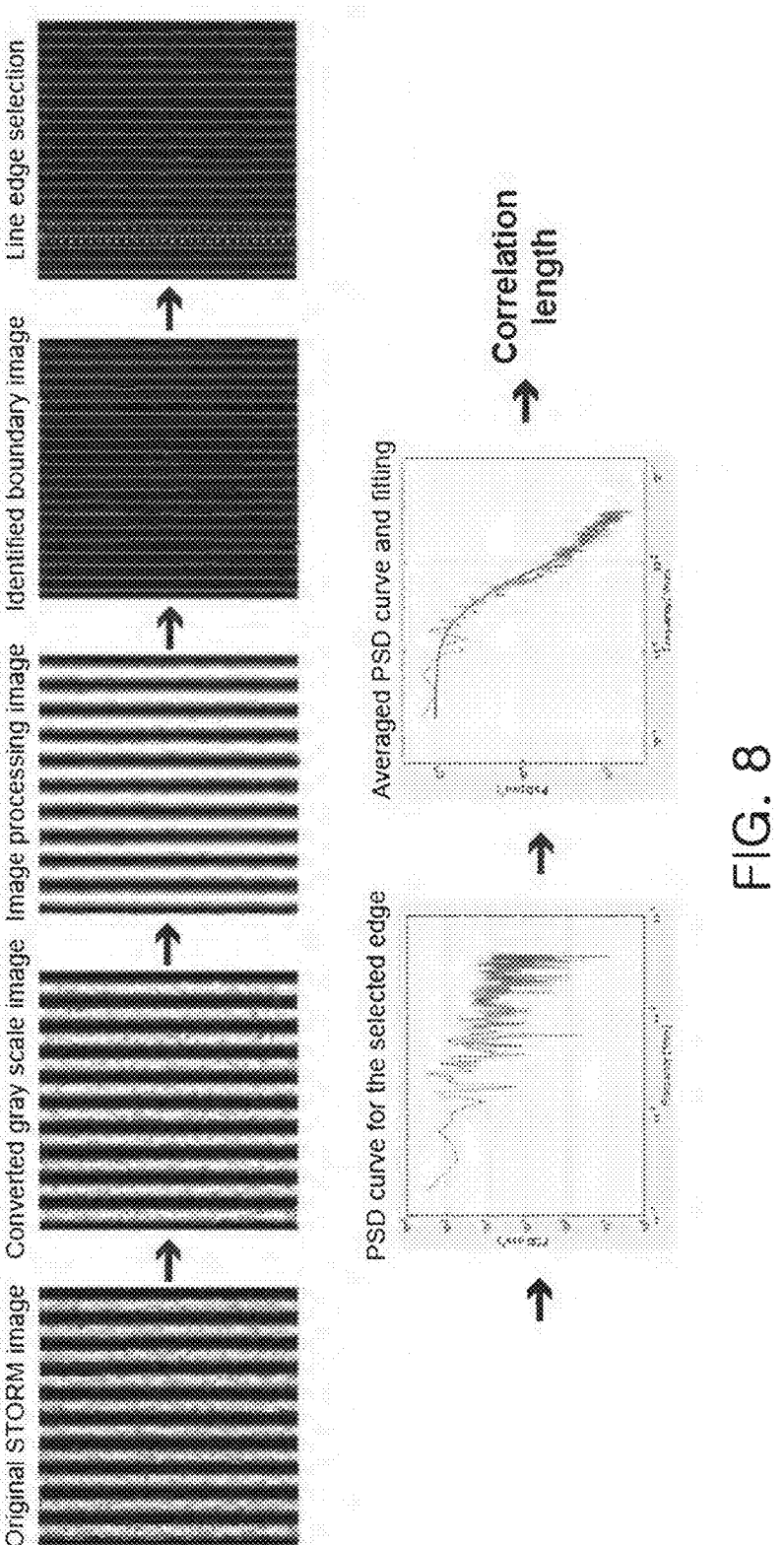
FIG. 8 is a schematic diagram illustrating a process of obtaining a correlation length by analyzing PSD of a line edge from a super-resolution fluorescence microscopy semiconductor image.

FIG. 8 is a schematic diagram illustrating a process of obtaining a correlation length by analyzing PSD of a line edge from a super-resolution fluorescence microscopy semiconductor image. Referring to FIG. 8, a method of performing PSD analysis through a super-resolution fluorescence microscopy is illustrated. In the same manner as LER analysis, an image obtained through super-resolution fluorescence microscopy may be converted into a gray-scale image, and an image processing process of creating erosion and dilation may be performed to detect only an outer portion of a line while filling an empty space of a stippled portion inside a line structure width. In this case, the Canny algorithm may be used for line edge detection. Thereafter, a displacement value of a line edge may be obtained by selecting a specific portion of the detected line edge, and a PSD curve may be obtained through FFT analysis. A PSD curve obtained from one line may be noisy, and thus fitting may be difficult with respect thereto. Accordingly, a plurality of PSD curves may be obtained with respect to a plurality of lines, an average thereof may be obtained, and a correlation length of a line edge may be obtained through fitting with respect to a curve.

Equation 1 may be an equation required to obtain a PSD curve. First, in order to obtain a PSD curve with respect to STORM experimental data, a PSD curve for a frequency may be drawn through FFT analysis on a length and a displacement value of a line. The PSD curve thus obtained may be a theoretical PSD curve, and thus fitting is possible. A correlation length may be obtained by performing curve fitting with respect to the PSD curve obtained from the STORM experimental data and substituting another known value except for the correlation length.

As illustrated in FIG. 8, a process of calculating the correlation length may be performed as follows. First, in the same manner as an LER analysis method, a fluorescence image of a super-resolution fluorescence microscopy may be converted into a gray-scale image to be represented as a one-dimensional image. Second, facilitate line edge detection, erosion and dilation operations may be used to fill an empty space of a stippled portion. Third, only a line edge may be detected using a line edge detection algorithm (for example, a Canny algorithm). Fourth, only a specific portion may be selected from an image of the detected line edge. Fifth, PSD curves of one selected line may be obtained. Sixth, an average of the obtained PSD curves may be obtained, and curve fitting may be performed to obtain a correlation length. Finally, the correlation length may be calculated from the PSD curve on which fitting is performed.

Through a technology for analyzing PSD of a line edge of a super-resolution fluorescence microscopy semiconductor image, developed in such a manner, a correlation length may be measured from $SiO_2/Si$ nanopatterns having various sizes within a substrate.

Figure 9A:
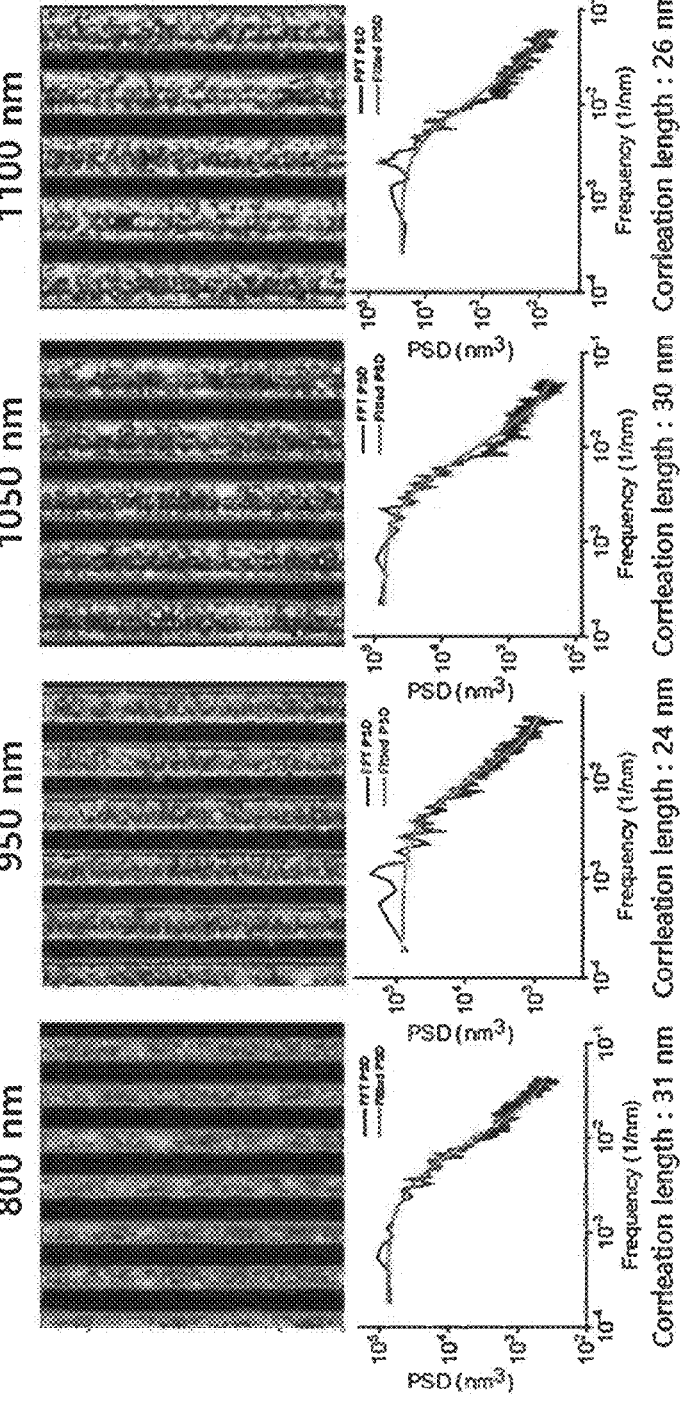
FIGS. 9A and 9B are example diagrams illustrating results of detecting line edges and analyzing PSD of $SiO_2$ and Si from a super resolution fluorescence microscopy semiconductor image.
Figure 9B:
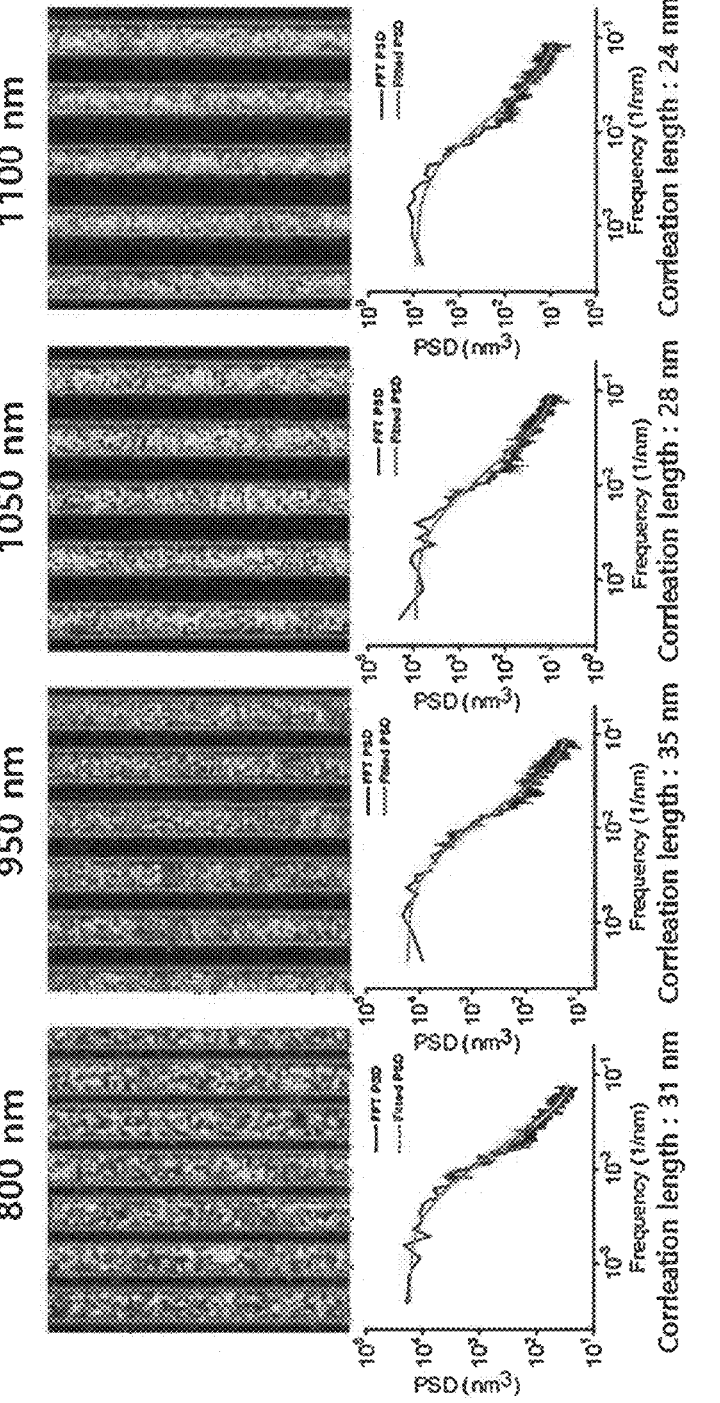

FIGS. 9A and 9B are example diagrams illustrating results of detecting line edges and analyzing PSD of $SiO_2$ and Si from a super resolution fluorescence microscopy semiconductor image. A numeral above an image may refer to a pitch value of each of $SiO_2$ and Si, and a numeral below the image may refer to a result value of a correlation length of a line edge.

Figure 10:
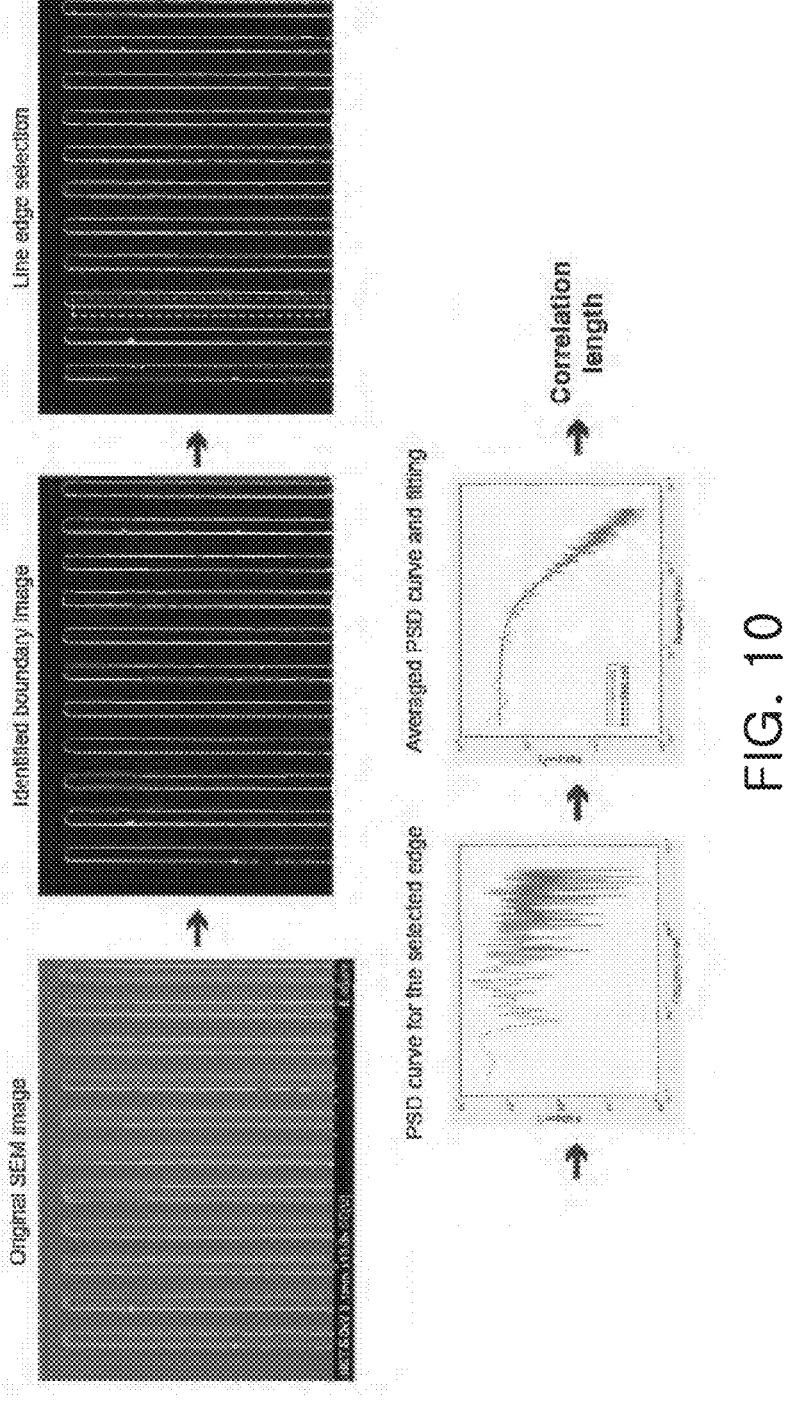
FIG. 10 is a schematic diagram illustrating a process of obtaining a correlation length through PSD analysis on a line edge from a scanning electron microscopy (SEM) image having a semiconductor line structure.

FIG. 10 is a schematic diagram illustrating a process of obtaining a correlation length through PSD analysis on a line edge from an SEM image having a semiconductor line structure. First, only a line edge may be detected using a Canny algorithm from an original SEM semiconductor image. Second, only a specific portion may be selected from an image of the detected line edge. Third, PSD curves of one selected line may be obtained. Fourth, an average of the obtained PSD curves may be obtained, and curve fitting may be performed to obtain a correlation length. Finally, the correlation length may be calculated from the PSD curve on which fitting is performed.

Figure 11:
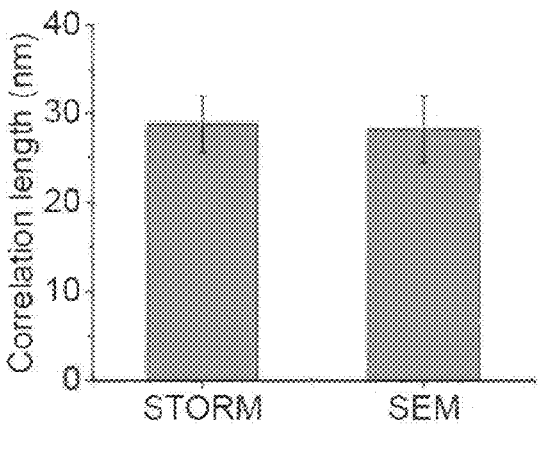
FIG. 11 is a diagram illustrating a result of comparison between correlation lengths obtained through PSD analysis of a super-resolution fluorescence microscopy semiconductor image and an SEM semiconductor image.

FIG. 11 is a diagram illustrating a result of comparison between correlation lengths obtained through PSD analysis on a super-resolution fluorescence microscopy semiconductor image and an SEM semiconductor image. Similarity between correlation length values measured with respect to the same type of sample may mean that PSD analysis measurement from a super-resolution fluorescence microscopy image, developed based on the present inventive concepts, has high reliability.

In order to verify a correlation length result value obtained through line edge PSD analysis analyzed from a super-resolution fluorescence microscopy semiconductor image, the correlation length result value may be compared to a correlation length value obtained through line edge PSD analysis analyzed from an SEM semiconductor image. The Canny algorithm may be used for detection of a line edge of the SEM semiconductor image. A displacement value of the line edge may be obtained by selecting a specific portion of the detected line edge, and a correlation length of the line edge may be calculated through curve fitting with respect to a PSD curve. Correlation length values obtained from PSD analysis on the super-resolution fluorescence microscopy semiconductor image and the SEM semiconductor image may be equal, which may mean that a method of performing PSD analysis on a super-resolution fluorescence image of a semiconductor line structure according to the present inventive concepts may provide reliable roughness information.

Automatic Detection of Nanoparticle Defect

In manufacturing a semiconductor substrate, a defect may degrade semiconductor performance, a technology for detecting nanoparticles in a semiconductor may be greatly important. Metrology and inspection technologies according to the related art have limitations with respect to detection of nano-level particles or defects. In the case of an imaging method, resolution is not high sufficient to observe nanoparticles. In the case of a sensing method, unless nanoparticles are periodically positioned, a signal to noise ratio (SNR) is low, making detection difficult. Conversely, in the case of a super-resolution fluorescence image, even a single molecule allows for high contrast detection compared to the background, and resolution is sufficient to observe nanoparticles, making it effective for nanoparticle detection.

The present inventive concepts disclose an image analysis technology capable of detecting nanoparticles from a super-resolution fluorescence image using an automatic process in order to more accurately and rapidly detect nanoparticles imaged by a super-resolution fluorescence microscopy. A nanostructure analysis technology according to the present inventive concepts may obtain information about a position, number, size, and shape of the detected nanoparticles.

Figure 12:
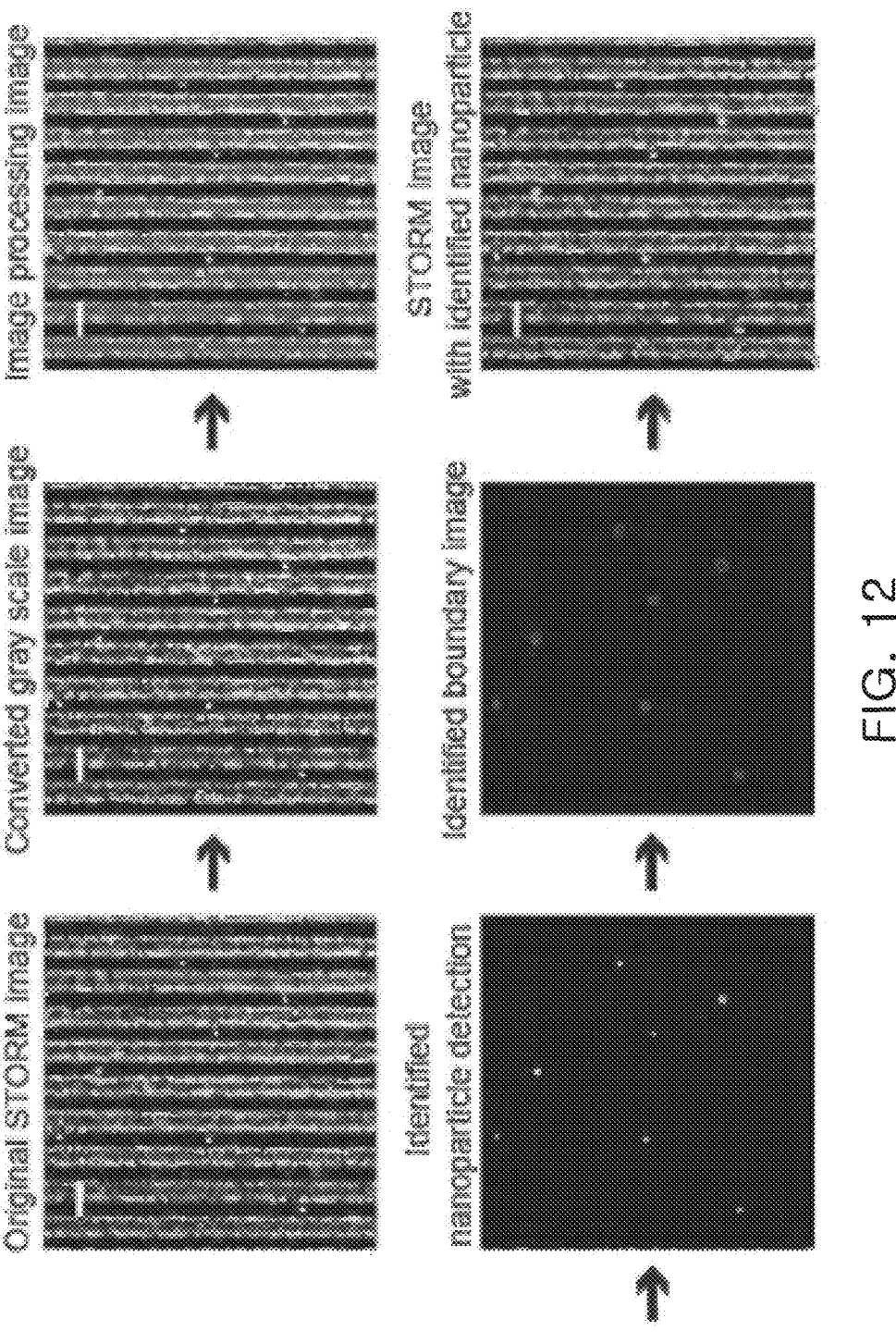
FIG. 12 is a schematic diagram illustrating a process of automatically detecting nanoparticles from a super-resolution fluorescence microscopy semiconductor image.

FIG. 12 is a schematic diagram illustrating a process of automatically detecting nanoparticles from a super-resolution fluorescence microscopy semiconductor image.

In an analysis process of automatically detecting nanoparticles from a super-resolution fluorescence microscopy image, an image obtained through super-resolution fluorescence microscopy semiconductor imaging may be converted into a gray-scale image, and an image processing process of creating erosion and dilation may be performed to detect only an outer portion while filling an empty space of a stippled portion inside nanoparticles. In this case, a boundary detection algorithm (for example, a strel algorithm) may be used to detect edges of the nanoparticles. An original super-resolution fluorescence microscopy semiconductor image may be overlaid with the automatically detected nanoparticles.

As illustrated in FIG. 12, a nanoparticle detection process may be performed as follows. First, an original image of a super-resolution fluorescence microscopy may be converted to a gray-scale image and represented as a single channel image. Second, in order to detect only nanoparticles, an empty space of a stippled portion may be filled through erosion and dilation operations, and a nanopattern excluding nanoparticles may be erased. Third, nanoparticles may be detected through a boundary detection algorithm (for example, a strel algorithm). Fourth, only an outer line of the detected image may be obtained. Finally, the original image of the super-resolution fluorescence microscopy may be overlaid with a line of the detected nanoparticles.

The fluorescence microscopy metrology system according to at least one example embodiment of the present inventive concepts may demonstrate an effect of amplifying a defective signal by attaching a phosphor to a nanometer-level structure, thereby enabling high-sensitivity signal acquisition.

Using a technology for automatically detecting nanoparticles of a super-resolution fluorescence microscopy semiconductor image according to the present inventive concepts, nanoparticles having various sizes within a substrate may be automatically detected.

Figure 13:
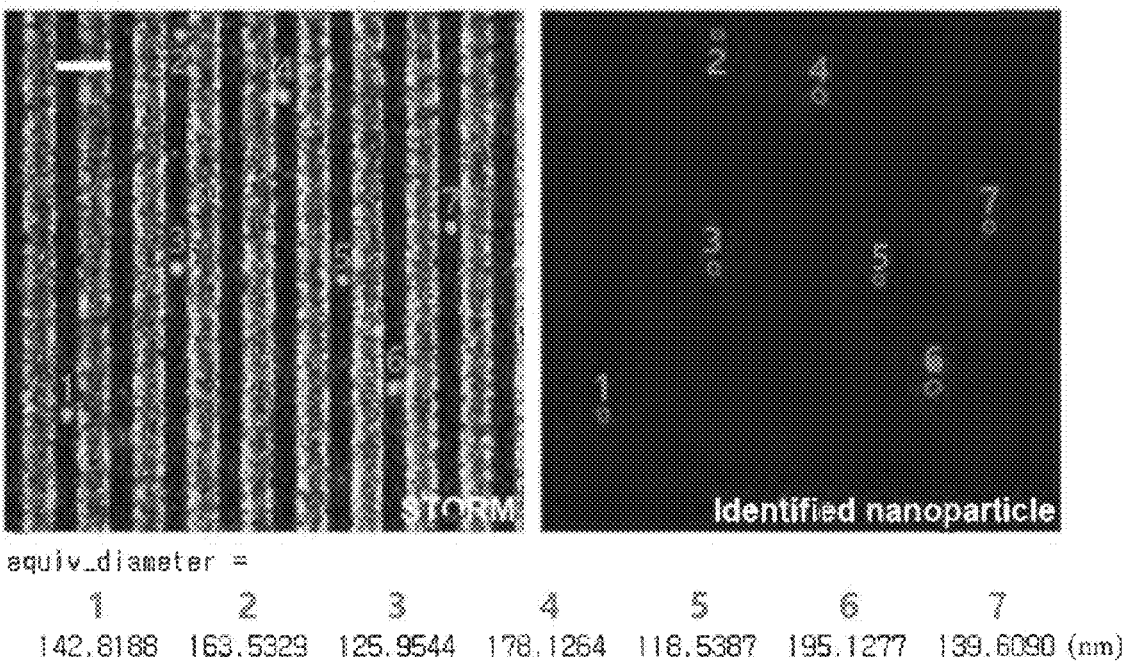
FIG. 13 is a diagram illustrating nanoparticles automatically detected from a super-resolution fluorescence microscopy semiconductor image.

FIG. 13 is a diagram illustrating nanoparticles automatically detected from a super-resolution fluorescence microscopy semiconductor image. Referring to FIG. 13, a numeral there below may be a result of automatically measuring a diameter of an automatically detected nanoparticle. A total of 7 nanoparticles having different sizes may be observed by the super-resolution fluorescence microscopy illustrated in FIG. 13, and a total of 7 nanoparticles detected and measured may also be accurately measured according to a shape and size thereof. Such a result may enable accurate and rapid detection of nanoparticles when semiconductor imaging is performed with the super-resolution fluorescence microscopy.

Figure 14:
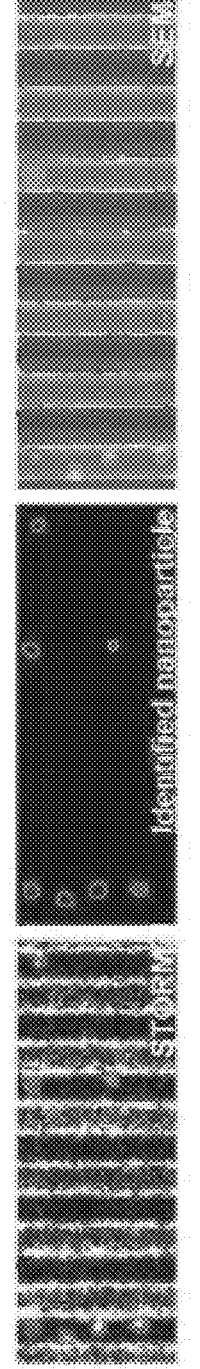
FIG. 14 is an example diagram illustrating nanoparticles automatically detected from a super-resolution fluorescence microscopy semiconductor image and an SEM semiconductor image.

FIG. 14 is an example diagram illustrating nanoparticles automatically detected from a super-resolution fluorescence microscopy semiconductor image and an SEM semiconductor image. As illustrated in FIG. 14, in order to verify the nanoparticles automatically detected from the super-resolution fluorescence microscopy semiconductor image, the super-resolution fluorescence microscopy semiconductor image may be compared to an SEM semiconductor image captured with respect to the same region of the same sample. A strel algorithm may be used to automatically detect nanoparticles from the SEM semiconductor image in the same manner. When comparing sizes of the nanoparticles automatically detected from the super-resolution semiconductor image and the SEM semiconductor image, the nanoparticles captured by STORM may be imaged and detected to be consistently larger by about 4 nm in size, as compared to the nanoparticles captured by an SEM.

Referring to FIG. 14, when comparing a portion observed and automatically detected by a super-resolution fluorescence microscopy and nanoparticles observed and automatically detected by an SEM microscope, nanoparticles may be well observed in the same portion. A technology for automatically detecting nanoparticles obtained from a super-resolution fluorescence image according to the present inventive concepts may exhibit high reliability. In addition, the high sensitivity of the nanoparticle detection technology according to the present inventive concepts may be demonstrated by confirming that nanoparticles, which are difficult to automatically detect from an SEM image due to a small size and low contrast thereof, are automatically detected from a STORM image.

Figure 15:
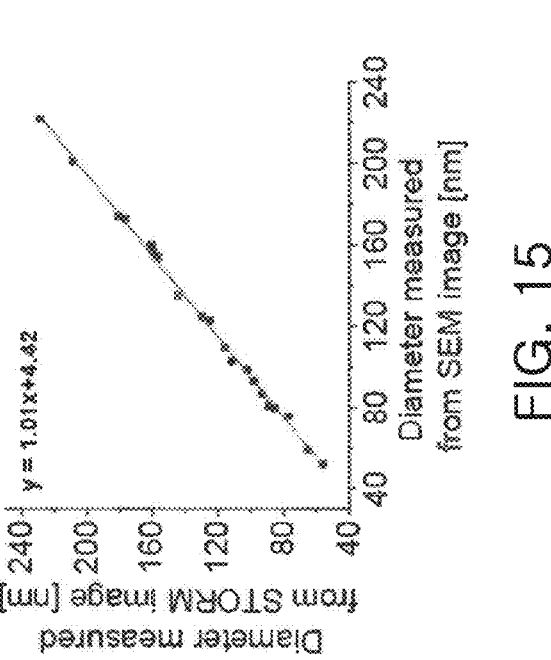
FIG. 15 is an example diagram illustrating a correlation between diameters of nanoparticles automatically detected from a super-resolution fluorescence microscopy semiconductor image and an SEM semiconductor image.

FIG. 15 is an example diagram illustrating a correlation between diameters of nanoparticles automatically detected from a super-resolution fluorescence microscopy semiconductor image and an SEM semiconductor image. FIG. 15 illustrates a correlation of nanoparticle diameter [e.g., nm] measured by STORM=1.01×(nanoparticle diameter [nm] measured by an SEM)+4.42. A linear relationship having a slope of 1 between sizes of nanoparticles imaged by both equipment may mean that a diameter of a nanoparticle measured by the super-resolution fluorescence microscopy is similar to a diameter of a nanoparticle measured by the SEM. The diameter of the nanoparticle measured by the super-resolution fluorescence microscope may be larger than the diameter of the nanoparticle measured by the SEM by about 4.42 nm due to a size of a labeled tag, and thus may be imaged as a larger particle and may exhibit higher sensitivity.

Figure 16A:
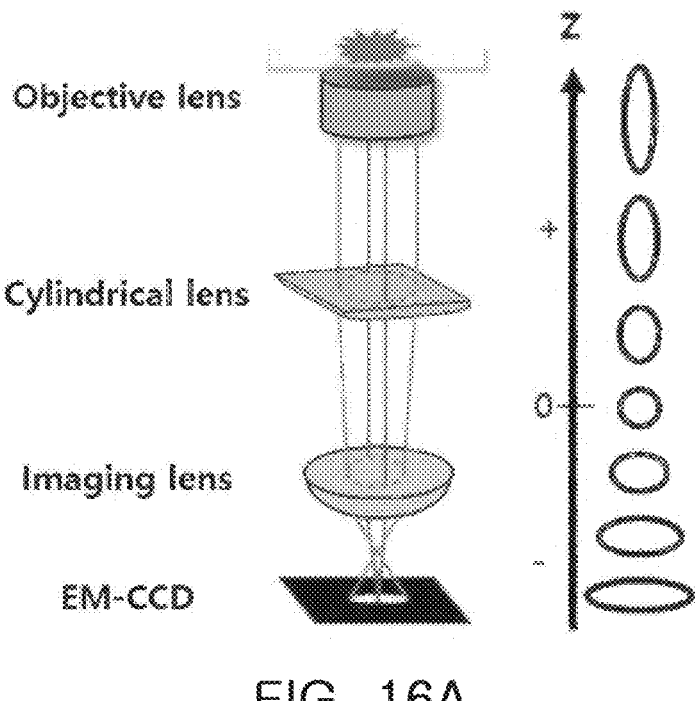
FIGS. 16A, 16B, and 16C are example diagrams illustrating inspection of a nanostructure defect using a point spread function (PSF) depending on a depth according to at least one example embodiment of the present inventive concepts.
Figure 16B:
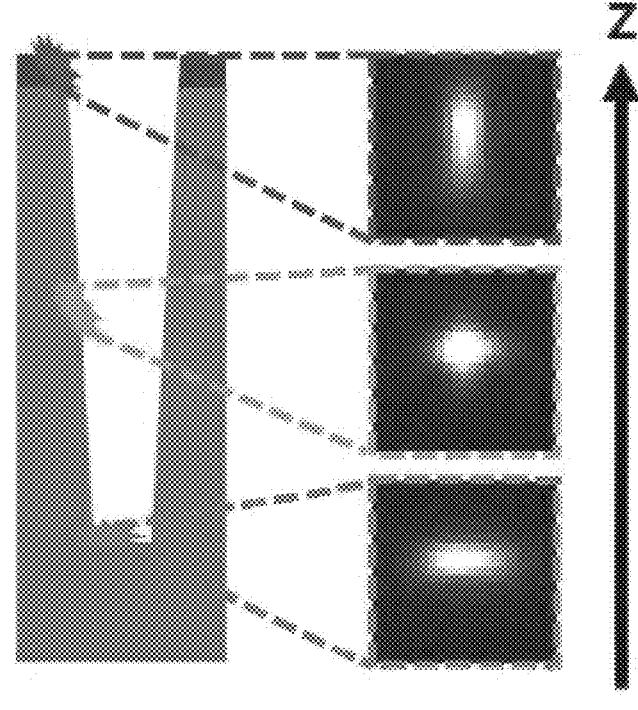
Figure 16C:
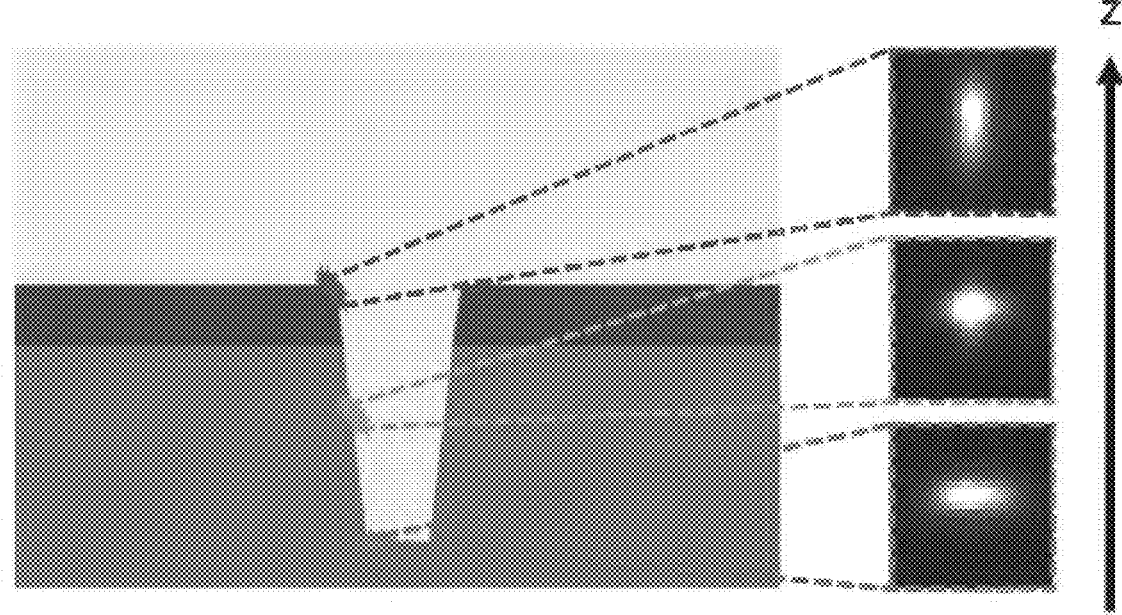

FIGS. 16A, 16B, and 16C are example diagrams illustrating inspection of a nanostructure defect using a PSF depending on a depth according to at least one example embodiment of the present inventive concepts. As illustrated in FIG. 16A, a depth (z) of the fluorescence microscope 100 may be distinguished using a top view image. As illustrated in FIG. 16B, nanoparticles may be detected by classifying defects by z-axis position in a trench structure using only a top view image. As illustrated in FIG. 16C, upper and lower defects may be classified in an interlayer structure using only a top view image.

Figure 17:
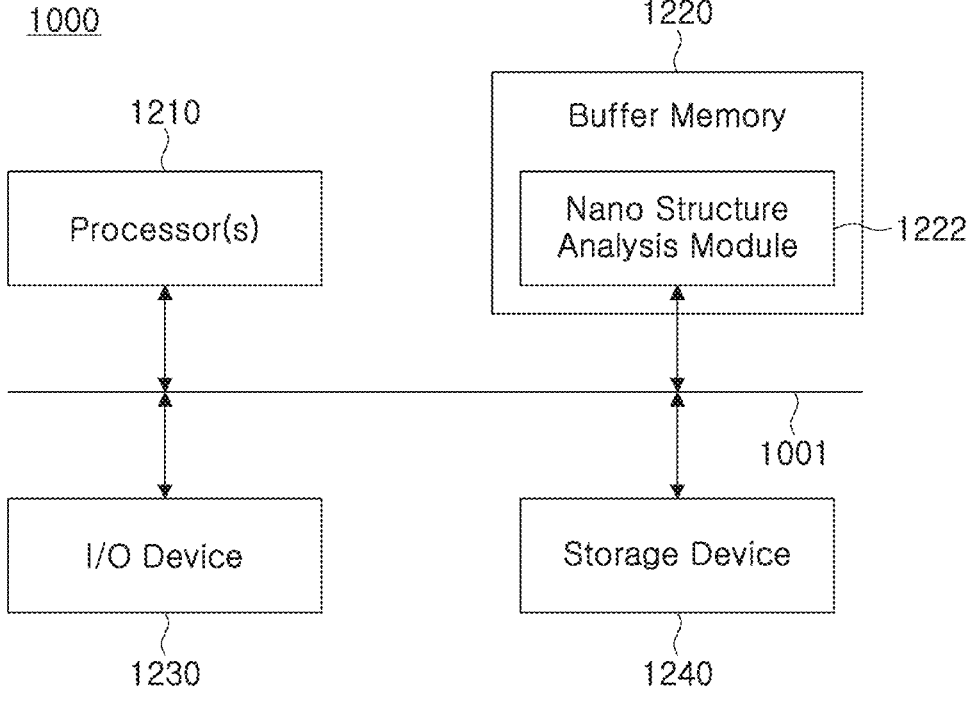
FIG. 17 is an example diagram illustrating a computing device 1000 for processing nanostructure analysis according to at least one example embodiment of the present inventive concepts.

FIG. 17 is an example diagram illustrating a computing device 1000 for processing nanostructure analysis according to at least one example embodiment of the present inventive concepts. Referring to FIG. 17, a computing device 1000 may include at least one processor 1210, a memory device 1220, an input/output device 1230, and a storage device 1240 connected to a system bus.

The computing device 1000 may be provided as a dedicated device for measuring a core structure of a semiconductor device. The computing device 1000 may include various metrology simulation programs. Through a system bus, a processor 1210, a memory device 1220, an input/output device 1230, and a storage device 1240 may be electrically connected to each other and may exchange data with each other. Components of the system bus 1001 is not limited to the above-described components, and may further include mediation measures for efficient management.

At least one processor 1210 may be implemented to control overall operations of the computing device 1000. The processor 1210 may be implemented to execute at least one instruction. For example, the processor 1210 may be processing circuitry and/or implemented to execute software (application programs, operating systems, and device drivers) to be executed in the computing device 1000. The processor 1210 may execute an operating system loaded into the memory device 1220. The processor 1210 may execute various application programs to be driven based on an operating system. For example, the processor 1210 may drive a nanostructure analysis module 1222 read from the memory device 1220. In at least one example embodiment, the processor 1210 may be a central processing unit (CPU), a microprocessor, an application processor (AP), or any processing device similar thereto.

The memory device 1220 may be implemented to store at least one instruction. For example, the memory device 1220 may be loaded with the operating system or application programs. During booting of the computing device 1000, an OS image stored in the storage device 1240 may be loaded into the memory device 1220 based on a booting sequence. Various input and output operations of the computing device 1000 may be supported by the operating system. Similarly, the application programs may be loaded into the memory device 1220 to provide a service selected by a user or a basic service. In particular, the nanostructure analysis module 1222 for processing a super-resolution fluorescence image may be loaded into the memory device 1220 from the storage device 1240. The nanostructure analysis module 1222 may include an algorithm for automatically analyzing a nanostructure (calculating LER, analyzing PSD, and detecting a nanoparticle defect) from a fluorescence image, as described above with reference to FIGS. 1 to 16C. In at least one example embodiment, the at least one instruction may further include instructions regarding a threshold roughness and/or nanoparticle density, such that, if the sample is determined to include a greater roughness or nanoparticle density than the threshold roughness and/or nanoparticle density than the sample may be identified as defective and may be discarded, reprocessed, and/or cleaned based on the degree of roughness and/or density. In at least one embodiment, if the number of samples that are identified as defective is larger than a second threshold, than the processing apparatus (e.g., used to produce the sample) may be identified as defective, and the processing apparatus may be identified as requiring correction, maintenance and/or cleaning.

In at least one example embodiment, the nanostructure analysis module 1222 may convert the fluorescence image into a gray-scale image, fill an empty space of a stippled portion of the converted gray-scale image through an erosion or dilation operation, detect a line edge from an image filling the empty space, select a specific portion of the detected line edge, and measure roughness of the selected specific line edge. In at least one example embodiment, the nanostructure analysis module 1222 may select a specific portion of a detected line edge, calculate a displacement value of the selected specific portion, obtain a PSD curve through fast Fourier transform (FFT) analysis on the displacement value, calculate an average of a plurality of PSD curves, and obtain the correlation length value of the line edge through fitting with respect to an average PSD curve. In at least one example embodiment, the nanostructure analysis module 1222 may convert the fluorescence image into a gray-scale image, perform erosion and dilation operations to detect an outer portion while filling an empty space of a stippled portion of the converted image, detect nanoparticles using a boundary detection algorithm, obtain an outer line of the detected image. The nanostructure analysis module 1222 may be configured to allow a line of the detected nanoparticles and the fluorescence image to overlap each other in order to identify the pattern and nanoparticles separately, thereby preventing (or mitigating the potential for) misidentification and/or characterization of the pattern and/or nanoparticles.

In addition, the memory device 1220 may be a volatile memory such as dynamic random access memory (DRAM), static random access memory (SRAM), or the like or a nonvolatile memory such as flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like.

An input/output device 1300 may be implemented to control an input and an output of a user from a user interface device. For example, the input/output device 1300 may include input measures such as a keyboard, a keypad, a mouse, and a touch screen to receive information from the user. The storage device 1400 may be provided as a storage medium of the computing device 1000. The storage device 1400 may store application programs, an OS image, and various pieces of data. The storage device 1400 may be provided in the form of a mass storage device such as a memory card (MMC, eMMC, SD, Micro SD, or the like), a hard disk drive (HDD), a solid-state drive (SSD), a universal flash storage (UFS), or the like.

The device described above may be implemented as a hardware component, a software component, and/or a combination of the hardware component and the software component. For example, a device and a component according to example embodiments may be implemented using one or more general purpose or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. A processing device may include an operating system (OS) and one or more software applications executed on the operating system. In addition, the processing device may also access, store, manipulate, process, and generate data in response to execution of software. For ease of understanding, in some case, it is described that the processing device is used a single processing element, but those skilled in the art could recognize that the processing device may include a plurality of processing elements or multiple types of processing elements. For example, the processing device may include a plurality of processors, or one processor and one controller. In addition, other processing configurations are also possible, such as parallel processors.

The software may include a computer program, a code, an instruction, or one or more combinations thereof, and may configure the processing device to operate as desired, or may independently or collectively instruct the processing device. The software and/or data may be embodied in any type of machine, component, physical device, virtual equipment, computer storage medium, or device to be interpreted by the processing device, or to provide instructions or data to the processing device. The software may also be distributed on a computer system via a network, and may be stored or executed in a distributed manner. The software and data may be stored on one or more computer-readable recording media.

According to embodiments of the present invention, a super-resolution fluorescence microscopy measurement system and an operating method thereof may achieve a resolution enhancement of more than 30 times compared to conventional optical equipment. By fluorescently labeling specific materials, the system maximizes selectivity. The super-resolution fluorescence microscopy measurement system and the operating method allow for the detection of minute defects that were previously difficult to detect with high throughput. Consequently, the present invention makes it feasible to acquire super-resolution fluorescence images at the nanoscale through the staining of semiconductor materials, followed by structural inspection measurements. The present inventive concepts may be applied to various systems for nanostructure metrology using super-resolution fluorescence microscopies (for example, STORM, STED, SSIM, PALM, and the like).

In a fluorescence microscopy metrology system and a method of operating the same according to example embodiments, information on a nanopattern structure and a defect may be automatically obtained by generating a super-resolution fluorescence image, detecting an edge, calculating LER, and analyzing PSD.

While example embodiments have been shown and described above, it will be apparent to those skilled in the art that modifications and variations could be made without departing from the scope of the present inventive concepts as defined by the appended claims.

What is claimed is:

1. A fluorescence microscopy metrology system comprising:

an optical system configured to generate a first light and a second light having different wavelengths, both the first light and the second light configured to excite a fluorescent material;

a microscope body configured to irradiate a sample, coated with the fluorescent material, with the first light and the second light received from the optical system such that the fluorescent material fluoresces from an excitation by the first light and by an excitation by the second light, and to receive the fluorescence generated from fluorescence switching in the fluorescent material;

an image detection device configured to detect a fluorescence image corresponding to the received fluorescence; and a nanostructure analysis device including processing circuitry configured to, from the detected fluorescence image, at least one of measure line edge roughness (LER) of the sample, analyze power spectral density (PSD) of the sample, or detect a nanoparticle defect of the sample, wherein the fluorescence switching is generated by repeated excitement of the fluorescent material by the first light and by the second light.

2. The fluorescence microscopy metrology system of claim 1, wherein the optical system includes:

a first light source configured to output the first light;

a second light source configured to output the second light;

a plurality of mirrors in at least one of a first optical path of the first light or a second optical path of the second light; and a plurality of lenses in at least one of the first optical path of the first light or the second optical path of the second light such that the plurality of lenses are configured to condense or emit light transmitted or reflected from one of the plurality of mirrors.

3. The fluorescence microscopy metrology system of claim 2, wherein the first light has a peak wavelength of 405 nm, and the second light has a peak wavelength of 647 nm.

4. The fluorescence microscopy metrology system of claim 1, wherein the nanostructure analysis device is configured based on a correlation analysis, and the correlation analysis is based on the sample having a Si pattern and a $SiO_2$ pattern alternately disposed, and the fluorescence image having a spatial resolution ranging from 10 nm to 20 nm.

5. The fluorescence microscopy metrology system of claim 1, wherein the nanostructure analysis device is configured to convert the fluorescence image into a gray-scale image;

fill an empty space of a stippled portion of the converted gray-scale image through at least one of an erosion or a dilation operation;

detect a line edge from an image with the filled empty space;

select at least a portion of the detected line edge; and measure roughness of the selected portion of the line edge.

6. The fluorescence microscopy metrology system of claim 5, wherein the nanostructure analysis device is configured to detect the line edge using a line edge detection algorithm.

7. The fluorescence microscopy metrology system of claim 1, wherein the nanostructure analysis device is configured to calculate a correlation length value indicating a frequency degree of roughness from a transition decay value of the LER for the analysis of the PSD.

8. The fluorescence microscopy metrology system of claim 7, wherein the nanostructure analysis device is configured to select at least a portion of a detected line edge;

determine a displacement value of the selected portion;

obtain a PSD curve through fast Fourier transform (FFT) analysis on the displacement value;

determine an average of a plurality of PSD curves based on the obtained PSD curve; and obtain the correlation length value of the line edge through fitting with respect to the average of the plurality of the PSD curves.

9. The fluorescence microscopy metrology system of claim 1, wherein the nanostructure analysis device is configured to obtain information on at least one of a position, number, size, or shape of nanoparticles.

10. The fluorescence microscopy metrology system of claim 1, wherein the nanostructure analysis device is configured to convert the fluorescence image into a gray-scale image;

perform erosion and dilation operations to detect an outer portion while filling an empty space of a stippled portion of the gray-scale image;

detect nanoparticles based on a boundary detection algorithm; and obtain an outer line image of the detected nanoparticles;

wherein the nanostructure analysis device is configured to allow for an overlap of a line of the detected nanoparticles and the fluorescence image.

11. A fluorescence microscopy metrology system for:

irradiating a sample with a first light and a second light such that the sample is excited by the first light and by the second light, the first light and the second light having different wavelengths to each other, and the sample including a fluorescent material;

receiving fluorescence generated by fluorescence switching in the fluorescent material;

detecting a fluorescence image corresponding to the received fluorescence; and analyzing a nanostructure from the fluorescence image, wherein the analyzing the nanostructure includes at least one of determining line edge roughness (LER) from the detected fluorescence image, analyzing power spectral density (PSD) from the detected fluorescence image, or detecting a nanoparticle defect from the detected fluorescence image, wherein the fluorescence switching is generated by repeated excitement of the fluorescent material by the first light and by the second light.

12. The fluorescence microscopy metrology system of claim 11, wherein the fluorescence microscopy metrology system includes a stochastic optical reconstruction microscopy (STORM) and an electron multiplying charge coupled device (EM-CCD).

13. The fluorescence microscopy metrology system of claim 11, wherein the determining the LER includes:

converting the fluorescence image into a gray-scale image;

filling an empty space of a stippled portion of the gray-scale image through at least one of an erosion or a dilation operation;

detecting a line edge from an image with the filled empty space;

selecting at least a portion of the detected line edge; and measuring roughness of the selected portion of the line edge.

14. The fluorescence microscopy metrology system of claim 11, wherein the analyzing the PSD includes:

selecting at least a portion of a detected line edge;

determining a displacement value of the selected portion;

obtaining a PSD curve through fast Fourier transform (FFT) analysis on the displacement value;

determining an average of a plurality of PSD curves based on the obtained PSD curve; and obtaining a correlation length value of the line edge through fitting with respect to the average of the plurality of PSD curves.

15. The fluorescence microscopy metrology system of claim 11, wherein the detecting the nanoparticle defect includes:

converting the fluorescence image into a gray-scale image;

performing erosion and dilation operations to detect an outer portion while filling an empty space of a stippled portion of the gray-scale image;

detecting nanoparticles based on a boundary detection algorithm; and obtaining an outer line image of the detected nanoparticles; wherein a line of the detected nanoparticles and the fluorescence image are allowed to overlap each other.

16. A fluorescence microscopy metrology system comprising:

an optical system configured to generate first light and second light having different wavelengths, both the first light and the second light configured to excite a fluorescent material;

a microscope body configured to irradiate a sample, coated with the fluorescent material, with the first light and the second light received from the optical system such that the fluorescent material fluoresces from an excitation by the first light and by an excitation by the second light, and to receive the fluorescence generated from fluorescence switching in the fluorescent material;

an image detection device configured to detect a fluorescence image corresponding to the received fluorescence; and a computing device comprising at least one processor, and a memory device storing instructions, which when executed in the at least one processor, cause the computing device to at least one of determine line edge roughness (LER) from the fluorescence image, analyze power spectral density (PSD) from the fluorescence image, or detect a nanoparticle defect from the fluorescence image, wherein the fluorescence switching is generated by repeated excitement of the fluorescent material by the first light and by the second light.

17. The fluorescence microscopy metrology system of claim 16, wherein the fluorescence image is received from a super-resolution fluorescence microscopy, and the fluorescence image has a spatial resolution ranging from 10 nm to 20 nm.

18. The fluorescence microscopy metrology system of claim 16, wherein the instructions further cause the computing device to convert the fluorescence image into a gray-scale image;

fill an empty space of a stippled portion of the converted gray-scale image through at least one of an erosion or a dilation operation;

detect a line edge from an image with the filled empty space;

select at least a portion of the detected line edge; and measure roughness of the selected portion of the line edge.

19. The fluorescence microscopy metrology system of claim 16, wherein the instructions further cause the computing device to select at least a portion of a detected line edge;

determine a displacement value of the selected portion;

obtain a PSD curve through fast Fourier transform (FFT) analysis on the displacement value;

calculate an average of a plurality of PSD curves based on the obtained PSD curve; and obtain a correlation length value of the line edge through fitting with respect to the average of the plurality of PSD curves.

20. The fluorescence microscopy metrology system of claim 16, wherein the instructions further cause the computing device to convert the fluorescence image into a gray-scale image;

perform erosion and dilation operations to detect an outer portion while filling an empty space of a stippled portion of the gray-scale image;

detect nanoparticles based on a boundary detection algorithm; and obtain an outer line of the detected nanoparticles;

wherein the instructions allow for a line of the detected nanoparticles and the fluorescence image to overlap each other.

* * * * *